US006956566B2

(12) United States Patent
Gelb (10) Patent No.: US 6,956,566 B2
(45) Date of Patent: Oct. 18, 2005

(54) STREAMING OF IMAGES WITH DEPTH FOR THREE-DIMENSIONAL GRAPHICS

(75) Inventor: Daniel G. Gelb, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 506 days.

(21) Appl. No.: 10/152,901

(22) Filed: May 23, 2002

(65) Prior Publication Data

US 2003/0218615 A1  Nov. 27, 2003

(51) Int. Cl.$^7$ .............................................. G06T 15/00
(52) U.S. Cl. ...................... 345/419; 345/653; 345/664
(58) Field of Search ........................ 345/555, 419–420, 345/427, 653, 664

(56) References Cited

U.S. PATENT DOCUMENTS

| 6,111,582 A | 8/2000 | Jenkins ........................ 345/421 |
| 6,222,551 B1 | 4/2001 | Schneider et al. .......... 345/419 |
| 6,628,282 B1 * | 9/2003 | Hertzmann et al. ......... 345/427 |

OTHER PUBLICATIONS

McMillan, Leonard, et al., "Plenoptic Modeling: An Image-Based Rendering System", Proceedings of SIGGRAPH '95, Los Angeles, CA, Aug. 6-11, 1995, p.p. 1-2.
McMillan, Jr., Leonard, "An Image-Based Approach To Three-Dimensional Computer Graphics", A dissertation submitted to the faculty of the University of North Carolina at Chapel Hill, 1997, p.p. 1-191.
Daniel Cohen-Or—"Model-Based View-Extrapolation for Interactive VR Web-Systems"—Proceedings Computer Graphics International Jun. 1997—pp. 104-112 & 248.
Ilmi Yoon et al—"Compression of Computer Graphics Images With Image-Based Rendering"—Proceedings of the SPIE Multimedia Computing and Networking vol. 3654—Jan. 1999—pp. 66-75.
Tze-kin Lao et al—"Automatic Generation of Virtual Environment from Vertical Panoramic Image"—Proceedings of the International Conference on Imaging Science, Systems & Technology—Jun. 2000—vol. 2—pp. 373379.

(Continued)

*Primary Examiner*—Kee M. Tung
*Assistant Examiner*—Mackly Monestime (57) ABSTRACT

An apparatus, executing on a server or similar machine and a client machine, and a corresponding method, includes mechanisms for rendering a two-dimensional image of a three-dimensional object, and streaming the thus-rendered image to the client machine. The mechanisms include a rendering module that generates a first image, from a first point of view, having a plurality of pixels, as first image data for display on a client machine, and generates first depth information for one or more of the plurality of pixels, and a compression module that compresses the first image data and the first depth information, wherein the first image data and the first depth information are provided to the client machine. A user input coupled to the rendering module, provides a command to the rendering module to change a point of view from the first point of view to a second point of view, wherein the rendering module generates a second image, as second image data, from the second point of view, the second image including second depth information for one or more pixels comprising the second image. The second image data and the second depth information are then provided to the client machine. The client machine includes a decompression module that receives compressed image data, the compressed image data including depth information related to one or more pixels comprising the three-dimensional representation, and decompresses the compressed image data; a display module that displays the generated images, wherein a first image is displayed; and a warp module that generates an interim image for display based on the image data, including the depth information, and a second point of view.

21 Claims, 6 Drawing Sheets

OTHER PUBLICATIONS

Jonathan Shade et al—"Layered Depth Images"—Proceedings of SIGGRAPH 98: 25th International Conference on Computer Graphics and Interactive Graphics Jul. 1998—pp. 231-242.

Toyohisa Kaneko et al—"View Interpolation With Range Data for Navigation Applications"— Proceedings of CG International '96—Jun. 1996—pp. 24-28.

* cited by examiner

STREAMING OF IMAGES WITH DEPTH FOR THREE-DIMENSIONAL GRAPHICS

TECHNICAL FIELD

The technical field is graphics processing and display systems, particularly systems that render three dimensional models and objects.

BACKGROUND

In a conventional client-server architecture, a remote server may store a three dimensional (3D) model of an object and may deliver various views of the 3D model to connected clients. The delivered 3D model views may contain data necessary to render a two dimensional image of the 3D model at the client. The client then renders and displays the 2D image, and supports user interactions with the 3D model. Such user interaction may include rotating and translating the 3D model, for example, so that different 2D images of the 3D model are displayed. For complex models, a large amount of data may be needed to describe the model's geometric properties so that an image may be rendered at the client. Should the user desire to change views of the object (e.g., rotate the object 90 degrees to the right), the server must send a new set of model data to the client for rendering and display as a new image. Because of bandwidth limitations between the server and the client, and possibly processing limitations at the client, the rendering and display of the new image may be delayed considerably. As a result, the user's perception of an interactive graphics session is detrimentally affected.

One solution to this long-latency problem is proposed in U.S. Pat. No. 6,222,551 B1 to Schneider et al. Here, a server side apparatus renders a selected number of views of an object, and transmits the selected views to the client for display. The client maps the selected views onto facets of the object, and then displays the rendered object, one or more facets at a time. One limitation with this system is that the user is limited to viewing only those precise views that were transmitted to the client and mapped to the object. Thus, for example, the user may be restricted to viewing six sides of a cubical object, with the point of view of each facet of the cubical object at a center of the six facets. The user cannot subsequently rotate or translate the object to alter the view by, for example, 30 degrees left or right.

Another solution to 3D image rendering is described in U.S. Pat. No. 6,111,582 to Jenkins. Here, a technique of primitive reprojection is used in which convex graphics primitives are reprojected elements. Elements known to be visible in a previous frame are first determined by transformation and depth-comparison rasterization of the elements. Regions of the image that may contain newly visible elements are located by occlusion-exposure transitions in a depth (z) buffer and from incremental view volume motion. In these regions, a depth-prioritized data-access method of spatial ray casting is used to identify newly-identified primitives for rasterization. The server-client system uses visibility event encoding in which data representing newly visible and newly invisible primitives for each frame are transmitted to the client for display.

SUMMARY

An apparatus, executing on a server or similar machine and a client machine, and a corresponding method, includes mechanisms for rendering a two-dimensional image of a three-dimensional object, and streaming the thus-rendered image to the client machine. The mechanisms include a rendering module that generates a first image, from a first point of view, having a plurality of pixels, as first image data for display on the client machine, and generates first depth information for one or more of the plurality of pixels, and a compression module that compresses the first image data and the first depth information, wherein the first image data and the first depth information are provided to the client machine. A user input coupled to the rendering module provides for a command to the rendering module to change a point of view from the first point of view to a second point of view, wherein the rendering module generates a second image, as second image data, from the second point of view, the second image including second depth information for one or more pixels comprising the second image. The second image data and the second depth information are then provided to the client machine.

The client machine includes a decompression module that receives compressed image data, the compressed image data including depth information related to one or more pixels comprising the three-dimensional representation, and decompresses the compressed image data; a display module that displays the generated images, wherein a first image is displayed; and a warp module that generates an interim image for display based on the image data, including the depth information, and a second point of view.

In an embodiment, all or part of the apparatus may be implemented in a computer-readble medium, including magnetic and optical data storage devices, for example.

DESCRIPTION OF THE DRAWINGS

The detailed description will refer to the following figures, in which like numbers refer to like elements, and in which.

DETAILED DESCRIPTION

Figure 1:
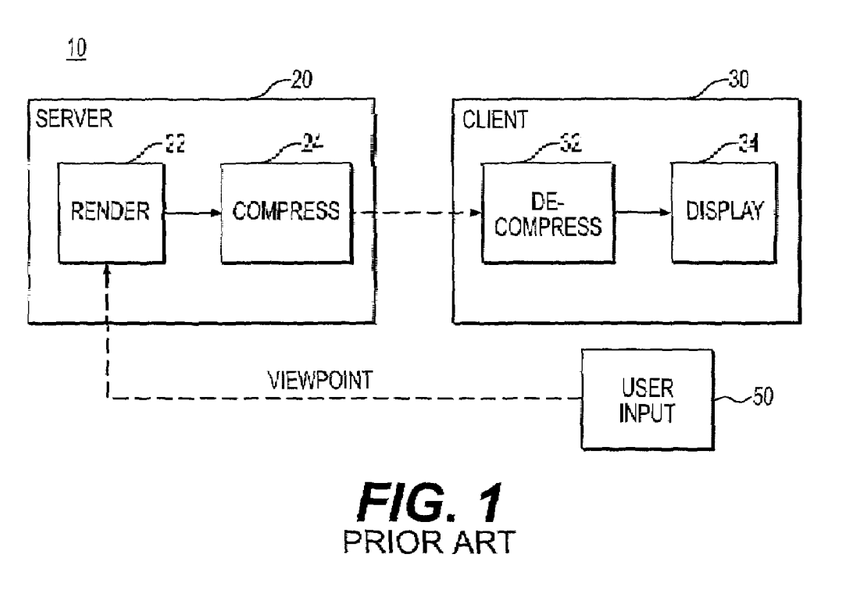
FIG. 1 is a diagram of a prior art server-client architecture for rendering three-dimensional models of objects.

A method and a mechanism are described herein that provided enhanced image rendering in a client-server architecture, and allow streaming of image data rendered at a server for display at a client. FIG. 1 illustrates a typical prior art architecture 10 in which a three dimensional (3D) object is modeled on a server 20 for display at a client 30. The server 20 and the client 30 may communicate using a digital data network 40. The server 20 may include a rendering module 22 and a compression module 24. The client 30 may include a decompression module 32 and a display module 34. The display module 34 may include any of a number of known display devices, including a flat panel display and a cathode ray tube, for example. A user may interface with the client 30 and the server 20 using a user input device 50. The user input device may include mechanisms such as a keyboard, a pointing device, and other known user input devices.

In a typical scenario, the server 20 provides an object that is modeled as a 3D model and rendered at the server 20 to create a digital file containing information related to each pixel comprising the 3D model. The user wishing to view the 3D model uses the client 30 to communicate with the server 20. Alternatively, the user may communicate with the server 20 using an alternate path that bypasses the client 30. The user may indicate a specific "view" of the 3D object that the user wishes to have displayed at the client 30. The server 20 then constructs (renders) the desired view, typically compresses the data representing the desired view, and sends the thus-rendered 2D view to the client 30. The client 30 decompresses the data, and displays the 2D view on the display 34.

Should the user desire to view the 3D object from another perspective, the user must communicate the perspective to the server 20, which will then render a new 2D view, and send the data corresponding to the new view to the client 30. Unfortunately, the time involved in rendering the new 2D view and receiving the data corresponding to the new 2D view may be relatively long, compared to the time to make the request for the new view, such that the changes do not appear to the user to be occurring in real time. In many applications, this latency in updating the rendered image due to changes in viewpoint can detract considerably from the viewing experience.

Figure 2A:
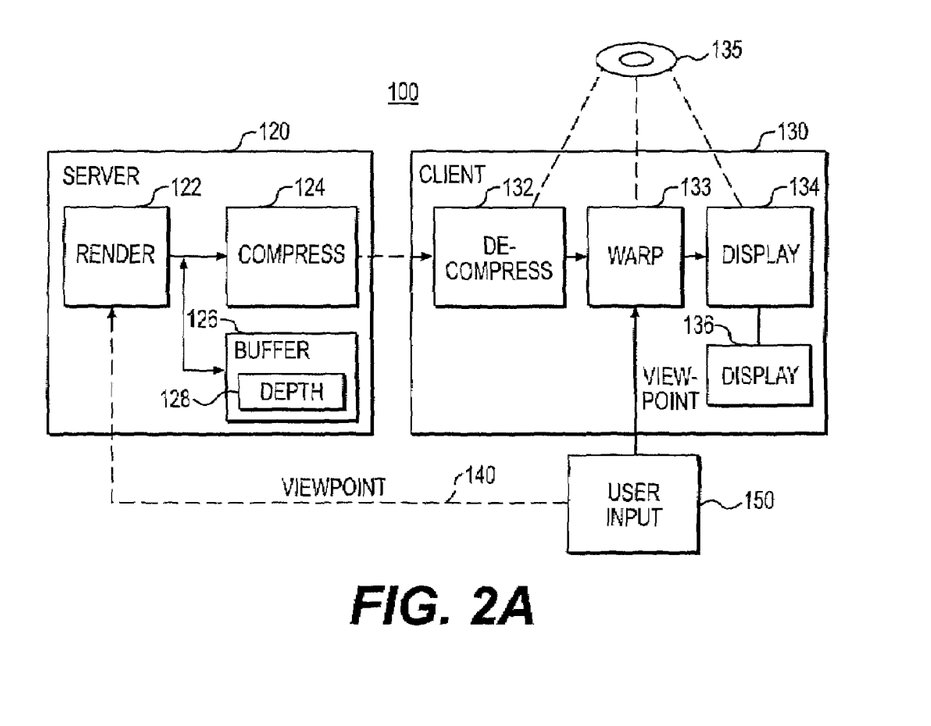
FIGS. 2A and 2B are diagrams of an improved server-client architecture for rendering three-dimensional models of objects.

FIG. 2A illustrates an improved 3D image architecture 100 that eliminates the round trip latency normally experienced with prior art client-server graphics architectures. The architecture 100 includes a server 120 having a rendering module 122 and a compression module 124. Also shown is a buffer 126 that may include a depth section 128. Use of the buffer 126 will be described in detail later. The server 120 is coupled to one or more clients, such as client 130 using a digital data transmission network 140. The network 140 may be any network capable of transmitting digital data, including, for example, the Internet. The client 130 includes a decompression module 132, a display module 134, and a warp module 133. The decompression module 132, display module 134, and warp module 133 may be provided as programming on a computer-readable medium 135. Such computer-readable medium 135 may be magnetic or optical storage, or any other computer-readable medium. The display module 134 may be operably coupled to a display 136, which may be a flat panel display, for example, on which a two dimensional representation of the 3D model is displayed. The decompression module 132 decompresses digital files sent from the server 120. The use of the warp module 133 will be described in detail later. A user may communicate with the client 130 and the server 120 using a user input device 150. The user input device 150 may include mechanisms for communicating directly with the client 130, including a keyboard, a pointing device such as a mouse, and speech recognition software, for example. In communicating with the server 120, the user input device 150 may use the client 130, or may communicate directly with the server 120 using the network 140 as shown.

In the server 120, the rendering module 122 serves to generate data representing a specific 2D view or image of a 3D object. The data representing the thus-rendered 2D image may then be compressed as a 2D image data file using standard compression techniques in the compression module 124 before transmission of the 2D image data file to the client 130. Upon receipt of an initial 2D image data file, the decompression module 132 may decompress the data. The thus-decompressed 2D image data is provided to the display module 134, which generates a 2D display for presentation on the display 136.

The buffer 126 may be used to store compressed and decompressed image data, including pixel depth information. The pixel depth information may be stored in the depth section 128 of the buffer 126. The depth section 128 may be controlled to store only the pixel depth information for a most recently generated 2D view. As subsequent views are generated, the pixel depth information in the depth section 128 may be updated.

In sending the generated 2D image data to the client 130, the server 120 also generates and sends to the client 130 additional information related to each or most pixels in the 2D image. For example, using a first viewpoint, the rendering module 122 may generate the 2D image, specifying pixel location, color, and other pixel characteristics for some or all pixels in the 3D model. Such data allow the display module 134 at the client 130 to recreate the 2D image as it appears from the first viewpoint on the display 136. However, the rendering module 122 also determines additional pixel information that may be provided with the generated 2D image. For example, the rendering module 122 may generate depth information for every pixel in the generated 2D image.

Figure 2B:
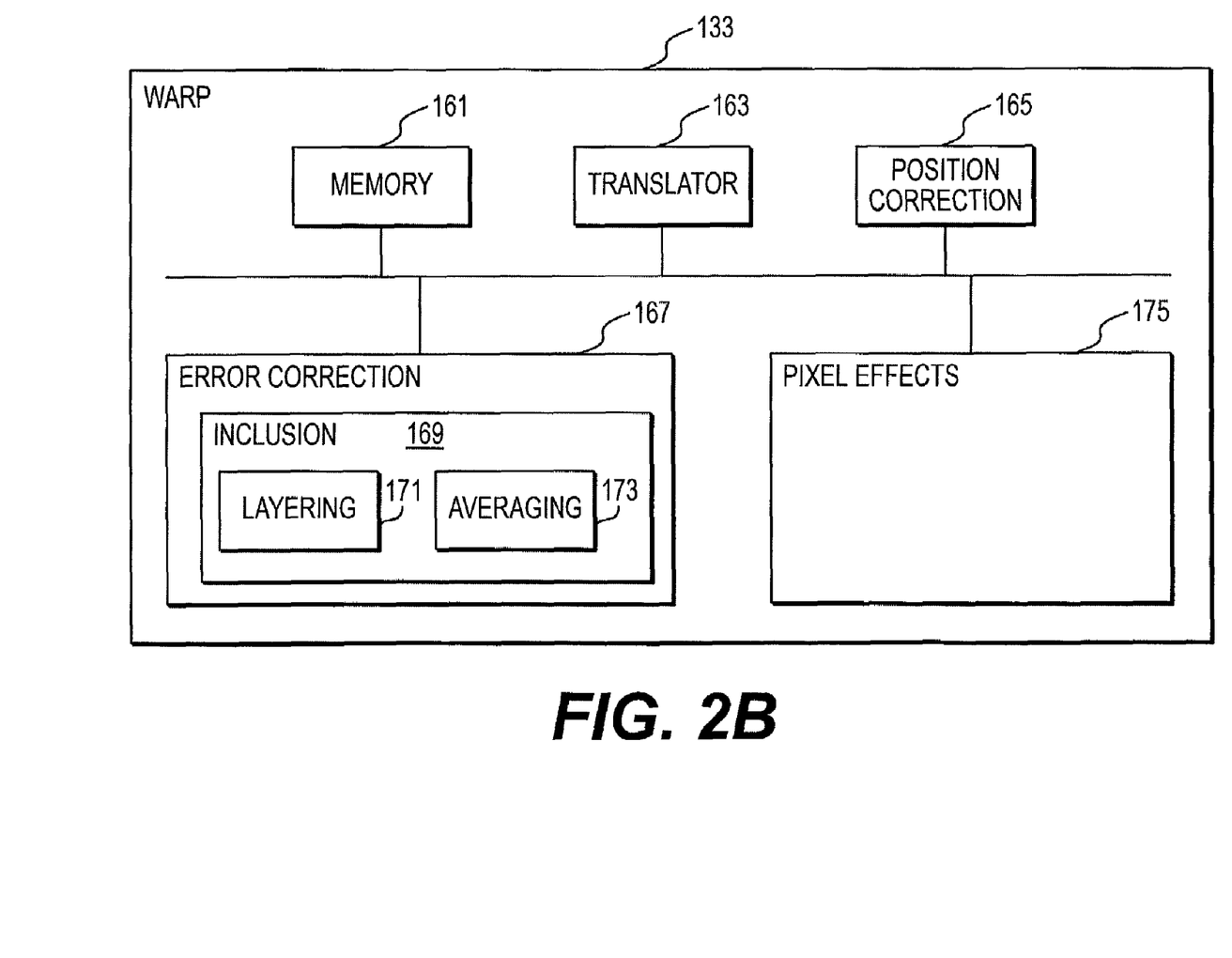

FIG. 2B is a block diagram of one possible implementation of the warp module 133. The warp module 133 includes means for storing image data, including pixel depth information. Such means may be embodied as a section of memory 161 in the client 130. The warp module 133 may further include a translator 163 that determines a transformation between pixels in a first point of view and pixels in a second point of view. The transformation may then be provided to a position correction module 165 that applies the transformation to one or more pixels in a first 2D image to locate the thus-corrected pixels in an interim 2D image. Also included in the warp module 133 may be an error correction module 167 that executes various image correction routines when generating the interim 2D image. The error correction module 167 may include an inclusion submodule 169 that provides interim image pixel data for image areas visible in the interim 2D image that were not visible in the first 2D image. At least two routines may be executed by the inclusion submodule 169. A layering routine 171 relies on additional pixel information provided by the rendering module 122. The additional pixel information relates to pixels in the 3D model that would not be visible in the first 2D image because of the perspective offered from the first viewpoint. For example, the rendering module 122 could provide pixel depth information, pixel color, and other pixel information for a specific number of pixels that would become visible should the first point of view translate so that the 3D object appears to rotate left or right 30 degrees. Alternatively, an averaging routine 173 may use pixel information for pixels adjacent to an area not visible in the first 2D image to use for pixels in an area that becomes visible in the interim 2D image. For example, the averaging routine 173 may use pixel depth and color information for a specific number of pixels adjacent to the newly visible area, and apply the pixel depth and color information to pixels that would be present in the newly visible area.

The error correction module 167 may also include a pixel effects submodule 175 that provides for pixel correction in the interim 2D image as the point of view changes. For example, should the point of view change such that the 3D object appears to rotate 30 degrees to the right, certain pixels that are in the first 2D image, and that remain in the interim 2D image may be affected by a change in reflected light.

This and other pixel effect may be accounted for by various routines executed by the pixel effects submodule 175.

Figure 3A:
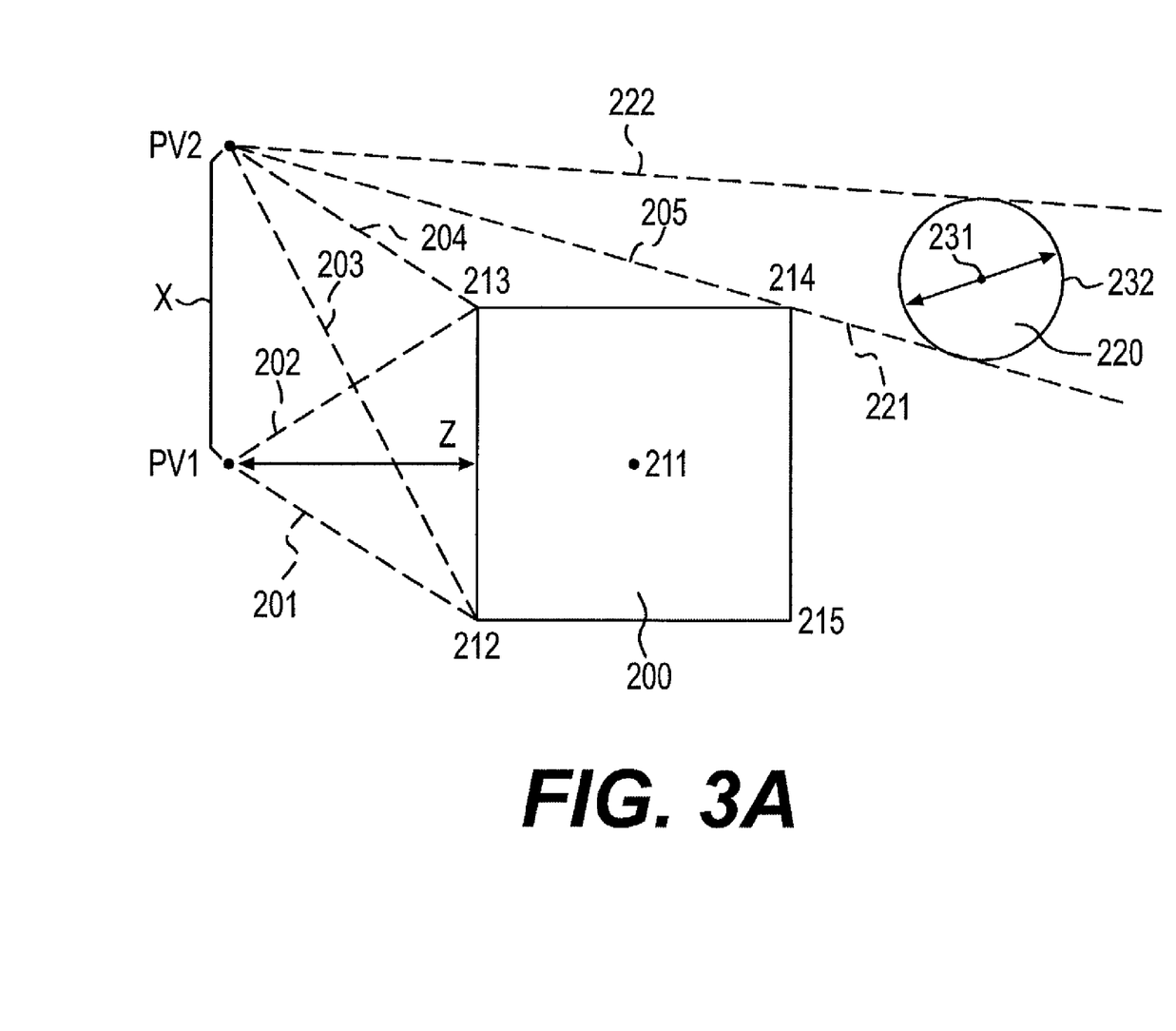
FIGS. 3A and 3B illustrate an example of streaming image data with depth.
Figure 3B:
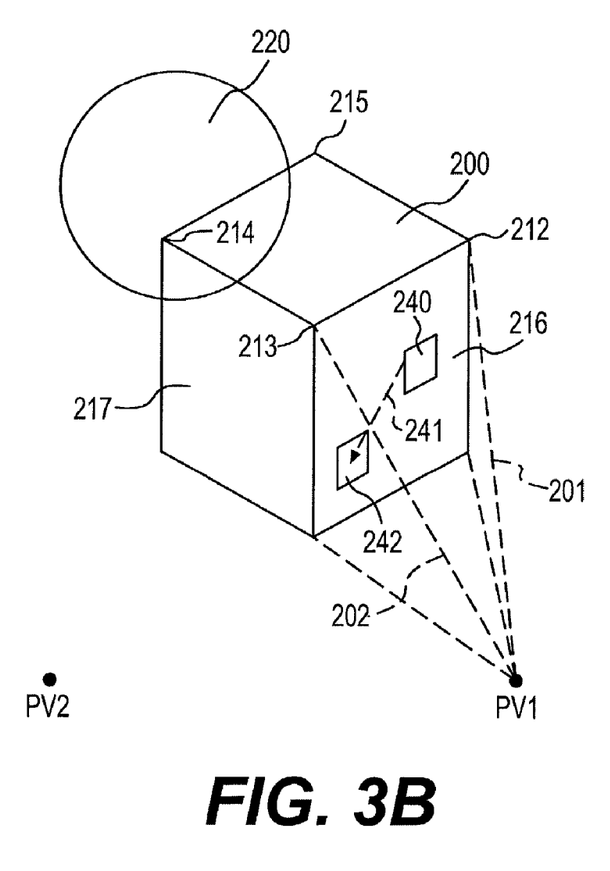

FIGS. 3A and 3B illustrate the manner in which pixel information may be generated by the rendering module 122. FIG. 3A is a top view of 3D objects 200 (a cube) and 220 (a sphere). FIG. 3B is a front perspective view of the cube 200 and the sphere 220. The cube 200 includes center 211 and corners (vertices) 212–215 (FIG. 3A); and faces 216 and 217 (FIG. 3B). The sphere 220 includes center 231 and circumference 232 (FIG. 3A).

Referring to FIG. 3A, a user first "observes" the objects 200 and 220 from point of view PV1. From PV1, only the cube 200 is visible, with sight lines 201 and 202 emanating from PV1 and terminating at the corners 212 and 213 to form an equilateral triangle as shown. Thus, when rendered as a 2D image on the display 136, the cube 200 will appear as a square (face 216—FIG. 3B) as seen from PV1. To generate the 2D image representing the face 216 of the cube 200, the rendering module 122 will create a digital file containing pixel information for some or all pixels comprising the face 216. Such pixel information may include a location of the pixel on the face 216, pixel color, luminance, and other pixel information needed to render the 2D image. The rendering module 122 may also generate depth information, or other information that may be used at the client to facilitate regeneration of the 2D image from a point of view other than PV1. For example, the rendering module 122 may provide digital data (e.g., a transform vector) related to the distance and angular displacement of each pixel from PV1. The thus-generated depth information is stored in the depth section 128 of the buffer 126. The depth information may also be provided to the client 130 along with other digital data comprising the 2D image.

Should the user desire to view the objects (the cube 200 and the sphere 220) from another perspective, the user could, for example, specify that the objects be shown from the point of view PV2 as shown in FIG. 3A. From PV2, both the cube 200 and the sphere 220 are, at least, partly visible. However, the cube 200 will appear in a different perspective that than seen from PV1. The difference is due in part to the apparent rotation of the cube 200 as the point of view shifts from PV1 to PV2. The difference may also be due in part to the presence of the sphere 220. For example, the sphere 220 may cause light to reflect off the cube 200 in a manner that would not occur in the absence of the sphere 220. In addition, certain characteristics of the 2D image as seen from PV1 may change as the view point shifts. For example, if the surface of the cube 200 is shiny, shifting the point of view from PV1 to PV2 may cause light to reflect off the cube 200 surface in a manner that varies with the change in view point.

To render the objects 200 and 220 from the point of view PV2, the rendering module 122 may send the client 130 a complete digital data file of the objects 200 and 220 as they appear from PV2. The display module 134 then generates a new 2D image of the cube 200 and sphere 220. The rendering module 122 may also send additional information such as depth information (distance and angular displacement from PV2, for example). However, due to bandwidth limitations, and other factors, a noticeable delay may be observed at the client 130 if the 2D image of the objects (the cube 200 and the sphere 220) were rendered based solely on the digital data generated from PV2. To enhance the image generation at the client 130, the digital data file received at the client 130, and corresponding to the first 2D image (i.e., the 2D image as seen from PV1) may be adjusted taking into account the change in position of the point of view from PV1 to PV2. That is, for each pixel on the face 216, the 2D image may be adjusted to account for the difference in distance and angular displacement of the pixel from PV1 to PV2. This change in the displayed 2D image may be accommodated by the warp module 133. That is, the warp module 133 makes the above-described adjustments to the 2D image, and the display module 134 then displays the adjusted image on the display 136 as an "interim" 2D image. However, the movement of the point of view from PV1 to PV2 may generate errors in the interim 2D image. For example, the interim 2D image may not include any portion of the sphere 220, and may not include any affects the presence of the sphere 220 may have on the cube 200. Subsequent to generation of the interim 2D image, the client 130 may receive from the server 120 the 2D image data as seen from PV2, decompress the 2D image data file, and overwrite the 2D image data corresponding to the interim 2D image to create a final version of the 2D image as seen from PV2.

To allow the client 130 to generate an interim, or "warped" image, the server 120, as noted above, provides the client with data related to the depth of the 3D objects from a specific point of view. This output (i.e., the depth information) of the 3D rendering process executed by the rendering module 122 is saved in the client 130 and may be input to the warp module 133, where the depth information is used in a warp algorithm to generate the 2D interim image. The warp algorithm may simply compare the relative displacement between the first point of view (e.g., PV1) and the next point of view (e.g., PV2) in order to generate the 2D interim image. Also as noted above, use of the warp algorithm may result in errors in the 2D interim image. To overcome such errors, improvements may be made to the manner in which the rendering module collects digital data from the 3D model, and in the way the warp algorithm applies the digital data to generate the 2D interim image. For example, the rendering module 122 may generate, in addition to pixel location and color information, additional information related to material properties of the 3D object at a particular point on the 3D object, such as how the particular point reacts to light changes, for example. Another correction factor to the 2D interim image may use data from objects, or portions of objects, that would not normally be visible from a specific view point. Using the example shown in FIG. 3A, the rendering module 122 may generate information layers corresponding to portions of the sphere 220 that would not normally be seen from PV1. This layered pixel information could then be used by the warp module 133 to generate the 2D interim image should the user specify another point of view.

The server-client architecture shown in FIG. 2A may also be used to reduce processing work at the server 120 when multiple users desire to view the same 3D object. In particular, the rendering module 122 may generate a first 2D image based on a first view point, and may then rely on the rendering on the warp algorithm to adjust the 2D image to suit the view points of one or more additional users.

As noted above, the data file corresponding to a 2D image may be compressed by the compression module 124, and decompressed at the client 130 using the decompression module 132. Similarly, depth information related to pixels in the 2D image may be compressed for transmission to the client 130. The depth information may be combined in the same data file as the image data, or may be provided in a separate file.

Figure 4:
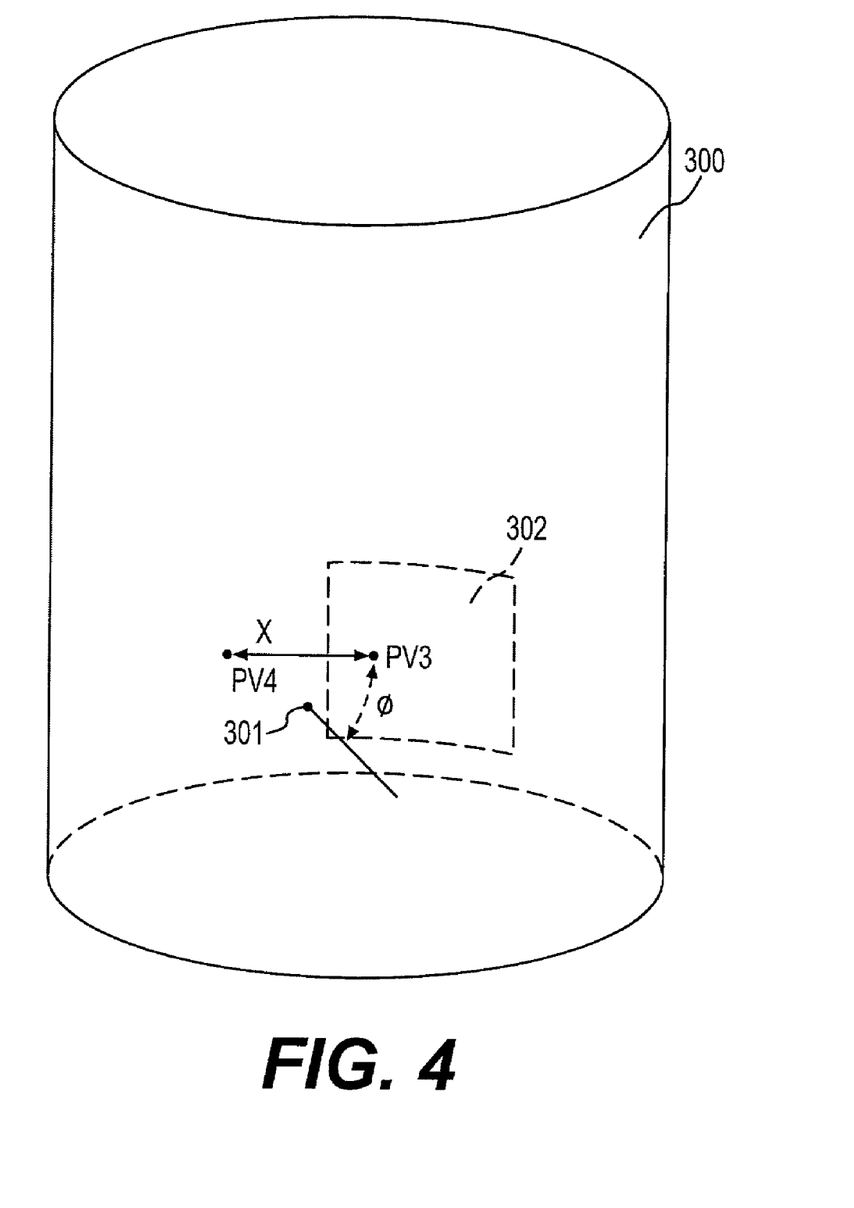
FIG. 4 illustrates an image representing a body of revolution surrounding a user's point of view.

The 2D image described above may be replaced with a more complex image using similar techniques as those illustrated in FIGS. 3A and 3B. FIG. 4 illustrates such a scenario in which a user at PV3 appears to be surrounded by an infinite cylinder 300 representing a digital image generated by the rendering module 122. That is, instead of generating a planar (2D) image, the rendering module 122 generates an image in the form of the cylinder 300. The user at PV3 is then able to view a section 302 of the cylinder 300 by specifying a radial displacement φ from a reference point 301. Similar to the cylinder 300, the rendering module 122 may generate a spherical image that surrounds the user. As might be expected, either the cylindrical image or the spherical image may constitute a much larger data file than that associated with the planar image. However, use of the cylindrical image or the spherical image allows the user to change a point of view without the need for additional computation by the warp module 133. By adding depth information to the cylindrical or spherical images, the user is then able to translate the point of view, in addition to merely rotating the point of view. That is, instead of only rotating PV3, the user may specify a new view point PV4 that is translated by a distance X from PV3. The warp module 133 will use the depth information related to the cylinder 300 (or sphere) to render a new image for display. Since the cylinder 300 (or the sphere) is a complete image, the client 130 will not need to receive updated image data from the server 120, and the image generated by the warp module 133 will be a final image.

The concept of the cylindrical and spherical images may be extended to other 3D bodies, such as a cube or a tetrahedron, for example.

In yet another embodiment of the 3D image architecture 300, the rendering module 122 does not record depth information for each pixel in the planar, 2D image. Instead, pixels with common features may be grouped together, and only data related to the group need be generated. For example, pixels with the same depth can be grouped, and a single depth value stored for the group. By such a grouping process, the amount of data that is transmitted from the server 120 to the client 130 may be reduced.

The server 120 may also accommodate dynamic imaging, or movement of all or part of the 2D image. For example, a group of pixels 240 may represent a movable portion of the face 216 of the cube 200 (FIG. 3A). A movement vector 241 may be associated with the pixel group 240 showing the relative motion of the pixel group 240, assuming the known direction and distance of movement is known, or can be predicted accurately. The pixel group 240 may be shown to move when the user remains at PV1 and/or when the user shifts the point of view to PV2. The movement of the pixel group 240 may be represented as a part of the interim 2D image generated by the warp module 133. When the final 2D image is rendered by the rendering module 122, an actual final position 242 of the pixel group 240 may be accurately represented.

Figures 5A, 5B:
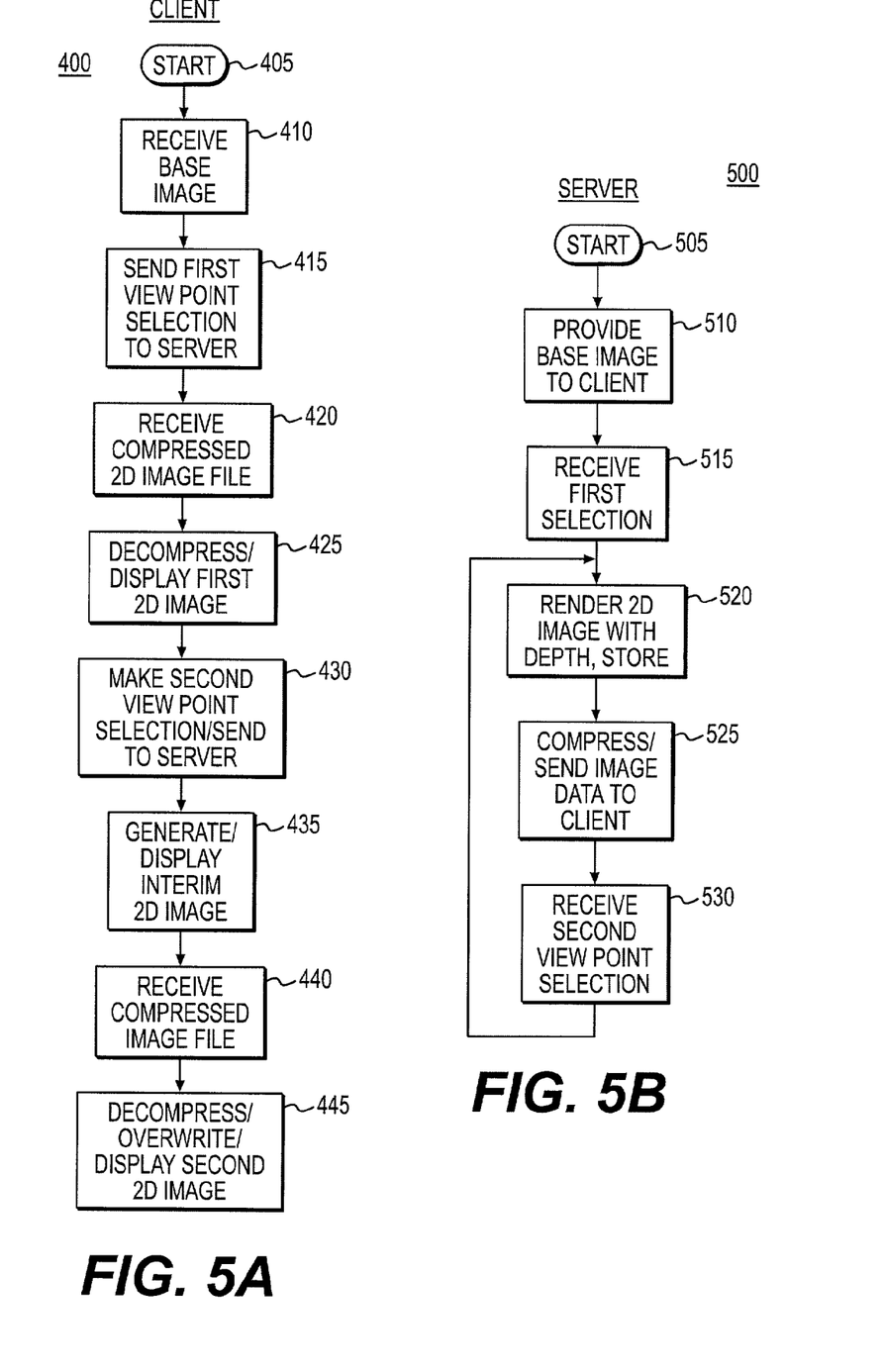
FIGS. 5A and 5B are flowcharts illustrating operations of the server-client architecture of FIGS. 2A and 2B.

FIGS. 5A and 5B are flowcharts illustrating image streaming operations 400 and 500 of the server-client architecture 100 of FIGS. 2A and 2B. In FIG. 5A, the operation 400 starts at block 405. In block 410, the client 130 displays a base image rendered by the server 130. In block 415, the user interface 150 sends a first viewpoint selection to the server 120 and the warp module 133. In block 420, the client 130 receives a compressed digital information file from the server 120 containing pixel information, including pixel depth information. In block 425, the decompression module 132 decompresses the image file and the display module 134 displays the first 2D image. In block 430, the user interface provides a second viewpoint selection to the server 120 and the warp module 133. In block 435, the warp module applies a warp algorithm to generate an interim 2D image based on the first 2D image and the pixel depth information. The warp module 133 may also execute various correction routines to enhance the accuracy of the interim 2D image. In block 440, the client 130 receives the second 2D image file from the server 120, and in block 445, the decompression module 132 decompresses the second 2D image file, the warp module 133 overwrites the received second 2D image over the interim 2D image, and the display module 134 displays the second 2D image.

The operation 500 shown in FIG. 5B starts at block 505. In block 510, the server 120 provides the base image to the client 130. In block 515, the server 120 receives the first viewpoint selection from the user interface 150. In block 520, the rendering module 122 renders a 2D image and generates pixel depth information. The thus generated data are stored in the buffer 126. In block 525, the compression module 124 compresses the image data and the depth information, and sends the compressed image file to the client 130. In block 530, the server 120 receives a second viewpoint selection. The operation 500 then returns to block 520.

What is claimed is:

1. An apparatus for use with three-dimensional graphics that streams images with depth, comprising:
    a rendering module that generates a first image, from a first point of view, having a plurality of pixels, as first image data for display on a client machine, and generates first depth information for one or more of the plurality of pixels;
    a compression module that compresses the first image data and the first depth information, wherein the first image data and the first depth information are provided to the client machine; and
    a user input coupled to the rendering module, wherein the rendering module receives an input to change a point of view from the first point of view to a second point of view, and wherein the rendering module generates a second image, as second image data, from the second point of view, the second image including second depth information for one or more pixels comprising the second image,
    wherein the second image data and the second depth information are provided to the client machine, said client machine including a warp module configurable to generate, prior to obtaining said second image data, an interim image that approximates said second image using the first image data and the first depth information to transform pixels in the first point of view to pixels in the second point of view.

2. The apparatus of claim 1, wherein the client machine further comprises:
    a decompression module that receives and decompresses image data and depth information; and
    a display module that generates a displayable image based on image data received from the apparatus.

3. The apparatus of claim 1, wherein the user input provides point of view information to the warp module.

4. The apparatus of claim 1, wherein the first image and the second image are planar images.

5. The apparatus of claim 1, wherein the first image and the second images are sections of three dimensional images, including one of a cylinder, a sphere, and a cube.

6. The apparatus of claim 1, wherein the plurality of pixels are arranged into a plurality of pixel groups, each of the pixels in a pixel group having a common feature, wherein a common feature includes depth information.

7. An apparatus for generating images for display based on image data from a first point of view of a three-dimensional representation of an object, the apparatus, comprising:

a decompression module that receives compressed image data, the compressed image data including depth information related to one or more pixels comprising the three-dimensional representation, and decompresses the compressed image data;

a display module that displays the generated images, wherein a first image is displayed; and a warp module that generates an interim image for display based on the image data, including the depth information, and a second point of view, the warp module including a point of view translator that derives a transformation from pixels in the first point of view to pixels in the second point of view, and a position correction module that applies the transformation to one or more of the one or more pixels to generate interim pixel data, the interim pixel data being usable to generate the interim image.

8. The apparatus of claim 7, further comprising a user interface operably coupled to the warp module, wherein the warp module receives a command to generate the interim image, the command specifying the second point of view.

9. The apparatus of claim 7, wherein the warp module further comprises:

a database to store the decompressed image data, including the depth information;

an error module, comprising:

an inclusion module that provides interim image pixel data for image areas visible in the interim image and not visible in the first image, and a pixel effects module that applies corrections to selected ones of the pixels to compensate for changes in visual qualities of the selected ones of the pixels.

10. The apparatus of claim 7, wherein one or more of the generated images is a two-dimensional image.

11. The apparatus of claim 7, wherein one or more of the images is one of a cylindrical image, a spherical image, a tetrahedron, and any other body of rotation.

12. The apparatus of claim 7, wherein the warp module further receives pixel information for selected pixels representing the three-dimensional object.

13. The apparatus of claim 7, wherein selected ones of the one or more pixels are grouped, and wherein the depth information is depth information for the pixel group.

14. The apparatus of claim 7, wherein the depth information is provided for individual pixels.

15. An apparatus for generating images for display based on image data from a first point of view of a three-dimensional representation of an object, the apparatus, comprising:

a decompression module that receives compressed image data, the compressed image data including depth information related to one or more pixels comprising the three-dimensional representation, and decompresses the compressed image data;

a display module that displays the generated images, wherein a first image is displayed; and a warp module that generates an interim image for display based on the image data, including the depth information, and a second point of view, wherein selected ones of the one or more pixels move during a display of the first image, the movement defined by a movement vector, wherein the warp module computes an expected position of the selected ones of the one or more pixels based on the movement vector.

16. A method for streaming images for a three dimensional graphic, comprising:

providing compressed first image data representing a first point of view of the graphic to a client, the first image data comprising first pixel data;

receiving a request for a second point of view from the client;

generating second image data related to the second point of view, the second image data correcting an interim image displayed at the client, the interim image being generated based on the first image data and a transformation of the first pixel data and by deriving the transformation from the one or more pixels comprising the first point of view to pixels comprising the second point of view, and applying the transformation to the one or more pixels comprising the first point of view; and providing the second image data to the client.

17. The method of claim 16, wherein providing the first image data comprises providing first pixel depth information, and wherein providing the second image data, comprises:

providing second pixel data; and providing second pixel depth information.

18. A method for streaming images with depth information for a three dimensional graphic, comprising:

receiving image data including depth information related to one or more pixels comprising a first representation of the three dimensional graphic, the first representation related to a first point of view of the three dimensional graphic;

displaying the first representation;

generating an interim image based on the image data including depth information and a second point of view of the three dimensional representation, said generating including deriving a transformation from the one or more pixels comprising the first representation to pixels comprising the second point of view, and applying the transformation to the one or more pixels comprising the first representation to generate the interim image; and displaying the interim image.

19. The method of claim 18, wherein generating the interim image further comprises:

providing the interim pixel data for image areas visible in the interim image and not visible in the first representation; and correcting selected ones of the one or more pixels comprising the first representation to compensate for changes in visual qualities of the selected ones of the one or more pixels.

20. A computer-readable medium comprising programming to allow streaming of images with depth for three dimensional graphics, the programming when executed comprising:

receiving image data including depth information related to one or more pixels comprising a first representation of the three dimensional graphic, the first representation related to a first point of view of the three dimensional graphic;

displaying the first representation;

generating an interim image based on the image data including depth information and a second point of view of the three dimensional representation, said generating including deriving a transformation from the one or more pixels comprising the first representation to pixels comprising the second point of view, and applying the transformation to the one or more pixels comprising the first representation to generate the interim image; and displaying the interim image.

21. The computer-readable medium of claim 20, wherein generating the interim image further comprises:

providing the interim pixel data for image areas visible in the interim image and not visible in the first representation; and correcting selected ones of the one or more pixels comprising the first representation to compensate for changes in visual qualities of the selected ones of the one or more pixels.

* * * * *